United States Patent
Strasser

(10) Patent No.: US 6,683,545 B2
(45) Date of Patent: Jan. 27, 2004

(54) MULTITURN ROTARY ENCODER WITH DETECTOR DEVICES ON A SHARED SIDE OF A PRINTED CIRCUIT BOARD

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/181,536

(22) PCT Filed: Sep. 22, 2001

(86) PCT No.: PCT/EP01/10966

§ 371 (c)(1),
(2), (4) Date: Sep. 30, 2002

(87) PCT Pub. No.: WO02/46702

PCT Pub. Date: Jun. 13, 2002

(65) Prior Publication Data

US 2003/0112157 A1 Jun. 19, 2003

(30) Foreign Application Priority Data

Dec. 6, 2000 (DE) .......................... 100 60 574

(51) Int. Cl.⁷ ................................ H03M 1/22
(52) U.S. Cl. ............... 341/16; 341/15; 341/9; 341/10; 250/231.13
(58) Field of Search ................ 341/15, 16, 9, 341/10, 11, 12, 13; 250/231.13, 231.14, 231.18

(56) References Cited

U.S. PATENT DOCUMENTS

| 4,530,155 A | * | 7/1985 | Burkhardt et al. ............ 33/1 L |
| 4,660,288 A | * | 4/1987 | Dangschat .................... 33/1 L |
| 6,542,088 B1 | * | 4/2003 | Bielski et al. ................. 341/15 |

FOREIGN PATENT DOCUMENTS

| DE | 28 17 172 | 10/1979 | |
| DE | 91 16 926 U | 8/1994 | |
| DE | 195 34 995 | 3/1997 | |
| WO | WO 99/7522 | 11/1999 | |
| WO | WO 99/57522 | 11/1999 | .................. 341/16 |
| WO | WO 00/34746 | 6/2000 | |

* cited by examiner

Primary Examiner—Michael Tokar
Assistant Examiner—Lam Mai
(74) Attorney, Agent, or Firm—Kenyon & Kenyon

(57) ABSTRACT

In a multiturn rotary encoder, a first code disk is arranged with an input shaft for detecting the angular position of the input shaft within one rotation. To detect the number of rotations of the input shaft, a multiturn part is provided with further code disks in the form of magnet bodies which are driven geared down. A printed circuit board having detector devices for scanning the first code disk and the magnet bodies is positioned between the first code disk and the multiturn part. The detector devices of the first code disk and of the magnet bodies are mounted on one common side of a printed circuit board which is opposite the first code disk.

14 Claims, 4 Drawing Sheets

MULTITURN ROTARY ENCODER WITH DETECTOR DEVICES ON A SHARED SIDE OF A PRINTED CIRCUIT BOARD

FIELD OF THE INVENTION

The present invention relates to rotary encoders.

BACKGROUND INFORMATION

In many cases, it is necessary to determine, in an absolute manner, the position of a shaft within one rotation, as well as the number of rotations. For this purpose, multiturn rotary, encoders are used as described, for example, in International Published Patent Application No. WO 99/57522, German Published Patent Application No. No. 28 17 172 and German Published Patent Application No. 195 34 995.

Such rotary encoders should have a compact design, and on the other hand, should exhibit high measuring accuracy. According to the rotary encoder described in German Published Patent Application No. 28 17 172, to provide a space-saving design, the code disks, driven via a step-down gear, are positioned within the peripheral area of the input code disk. The detector elements for scanning the input code disk and the code disks, driven geared down relative thereto, are arranged on different printed circuit boards.

In the case of the multiturn rotary encoder described in German Published Patent Application No. 195 34 995, the detector elements for scanning an input code disk and code disks driven geared down relative thereto, are arranged on one side of a shared printed circuit board. To achieve this, the code disks, driven in a geared-down manner, are arranged spatially next to the input code disk, which increases the size and hinders the design, since no modular design is possible.

SUMMARY

It is an object of the present invention to provide a multiturn rotary encoder which has a compact configuration, permits a modular type of construction and has high angular resolution.

The detector devices of the input code carrier and of the code carriers driven geared down relative thereto may be applied on a single surface of a printed circuit board in a joint process step.

The opposite surface of the printed circuit board is available for further components for the signal processing, and may be fitted with components according to a further method. Moreover, at least substantially the entire periphery of the rotary encoder may be used for the coding of the input code carrier, thereby permitting a maximum angular resolution as a function of the entire periphery of the rotary encoder.

DETAILED DESCRIPTION

Figure 1:
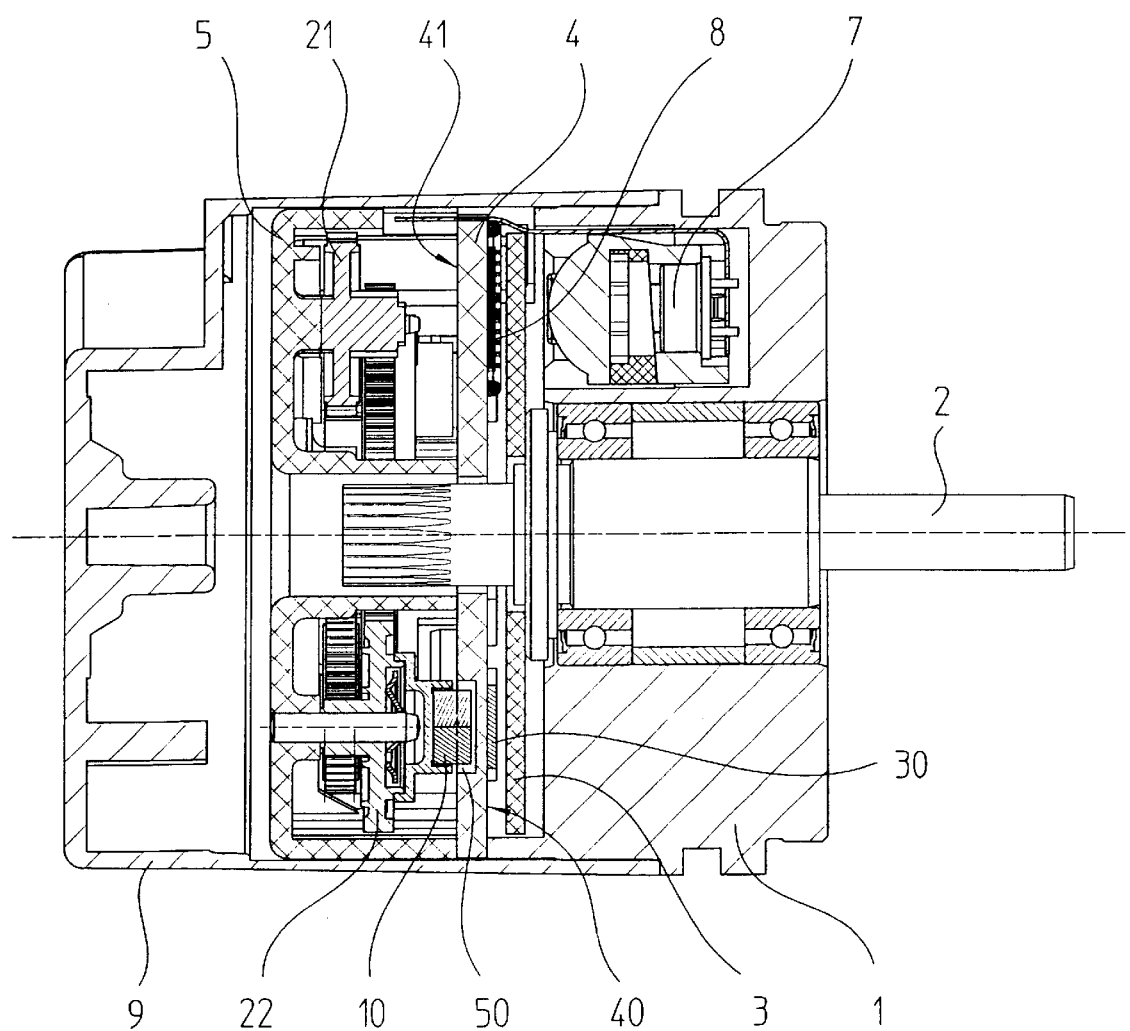
FIG. 1 is a schematic cross-sectional view of a multiturn rotary encoder.

The multiturn rotary encoder has a modular configuration and is made of a support part 1, an input shaft 2 having an input code disk 3 secured thereto, a printed circuit board 4 and a multiturn part 5. To detect the absolute position within one rotation of input shaft 2, the disk 3 bears a coding 6 which is illuminated by a light source 7 and is scanned by a detector device 8. Coding 6 is a multitrack code, e.g., a Gray code, the finest track being a high-resolution incremental track which may be positioned as far as possible outside at the periphery of code disk 3, to permit the arrangement of as many grating periods as possible over the periphery. The more grating periods are disposed over the entire periphery, the higher is the angular resolution of the rotary encoder to be detected.

Input shaft 2 is rotationally mounted in support part 1 and drives further code carriers 10, 11, 12 in a geared-down manner. To that end, disposed in multiturn part 5 is a step-down gear 20, of which gear wheels 21 and 22 are illustrated in cross-section in FIG. 1. The further code carriers 10, 11, 12 are used for measuring the number of rotations of input shaft 2, each further code disk 10, 11, 12 being driven, geared down via step-down gear 20, by respective preceding code carrier 10, 11, 12; and for scanning each code carrier 10, 11, 12, a detector device 30 is provided, of which only one is illustrated in the Figures. For the space-saving configuration, code carriers 10, 11, 12 are arranged, at least substantially, completely within the peripheral area of input code disk 3.

Figure 3:
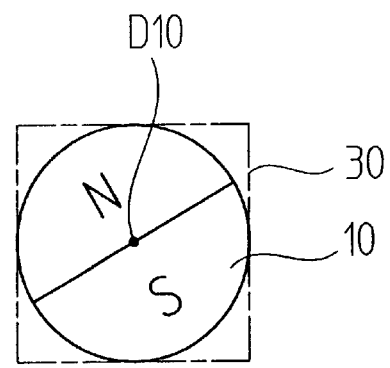
FIG. 3 is a plan view of a magnetic code carrier of the multiturn part.

Rotation axes D10, D11, D12 of code carriers 10, 11, 12 are disposed concentrically and parallel to input shaft 2, and code carriers 10, 11, 12 are arranged in a common plane. Each of the code carriers is a magnet body 10, 11, 12 having magnet poles (North-South) disposed alternating in the circumferential direction. In the simplest case, each magnet body 10, 11, 12 is implemented as a bar magnet having a single north pole and south pole. Such a magnet body 10 is illustrated in plan view in FIG. 3. The magnetic field of this magnet body 10 is detected by detector device 30 which is sensitive to magnetic fields and which generates and outputs an electrical measuring signal as a function of the angular position of magnet poles N and S. This measuring signal may already be a digital, serial code word dependent on the angular position. To that end, each of detector devices 30 is a semiconductor substrate having a spatial arrangement of a plurality of magnetic-field-sensitive sensor elements in the form of Hall or magnetoresistive elements integrated therein, and includes an evaluation circuit having amplifiers, as well as analog-digital converters, to in each case output a digital code word having a plurality of bits at the output of detector devices 30, the code word indicating the absolute angular position of allocated magnet body 10, 11, 12.

Detector device 8 for the photoelectric scanning of input code disk 3, and detector devices 30 for detecting the magnetic fields of magnet bodies 10, 11, 12 are semiconductor components, and are applied on a common surface 40 or side of printed circuit board 4, and are electrically contacted. This surface 40 of printed circuit board 4 is arranged directly opposite input code disk 3. Multiturn part 5 having magnet bodies 10, 11, 12 is opposite the other surface 41 of printed circuit board 4. The one surface 40 of printed circuit board 4 may be fitted with components by a first method, and opposite surface 41 is fitted with components using a second method deviating therefrom. Photoelectric detector device 8 and magnetic-field-sensitive detector devices 30 are contacted by wire bonding on surface 40, and electrical components for processing the scan signals of detector devices 8, 30 are SMD components and are surface-mounted on surface 41.

Figure 2:
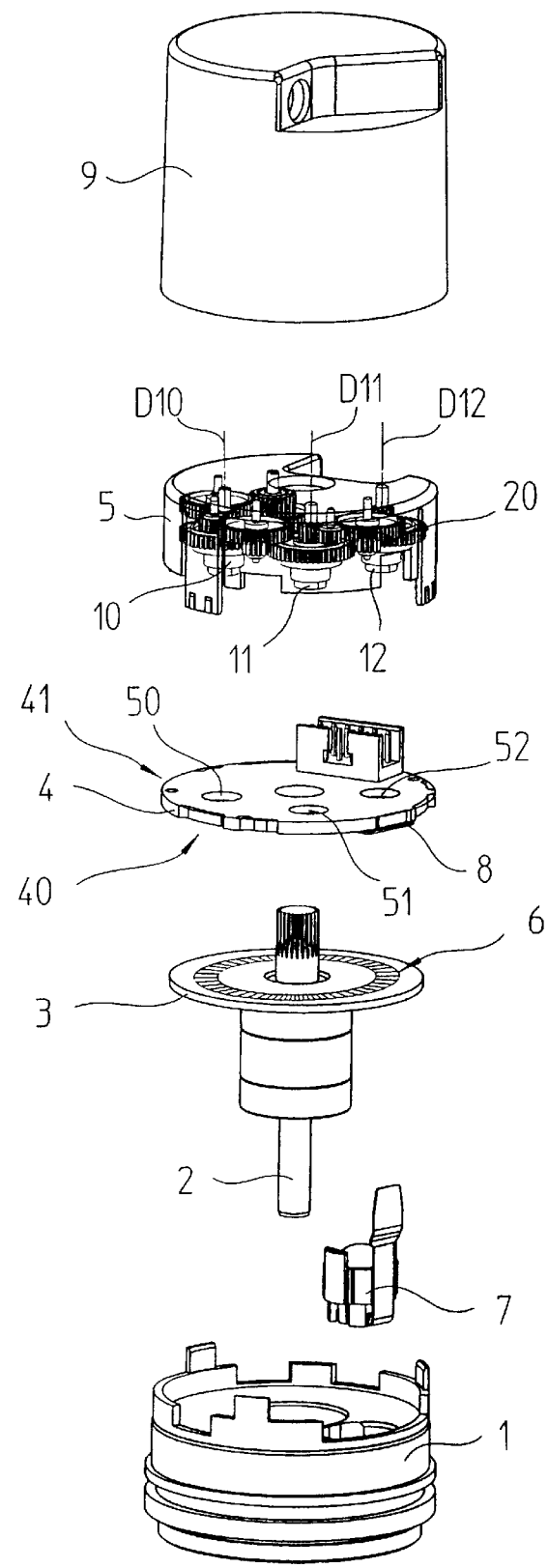
FIG. 2 is an exploded view of the multiturn rotary encoder.

Printed circuit board 4, at least in the region in which it bears photoelectric detector device 8 and in which it is secured on support part 1, is thick and therefore stable. In the scanning regions for detecting the magnetic fields of magnet bodies 10, 11, 12, in which magnetic-field-sensitive detector devices 30 are disposed, printed circuit board 4 is reduced in thickness or provided with openings. FIG. 1 illustrates one of these thinner regions in the form of a blind-end bore 50, and FIG. 2 illustrates schematically a blind-end bore 50, 51, 52 for each magnet body 10, 11, 12. The distance between magnetic-field-sensitive detector devices 30 and magnet bodies 10, 11, 12 may be selected to be approximately or even less than the thickness of printed circuit board 4, the quality, e.g., the amplitudes of the scan signals, thereby being increased.

Multiturn part 5, code disk 3 and printed circuit board 4 are protected from environmental influences by a shared cover 9.

In the exemplary embodiment illustrated in FIGS. 1 and 2, code disk 3 is scanned in transmitted light. However, the present invention is also applicable for a code disk able to be scanned in incident light, in that light source 7 is also positioned on printed circuit board 4 on side 40, and may be contacted there, as well.

Figure 4:
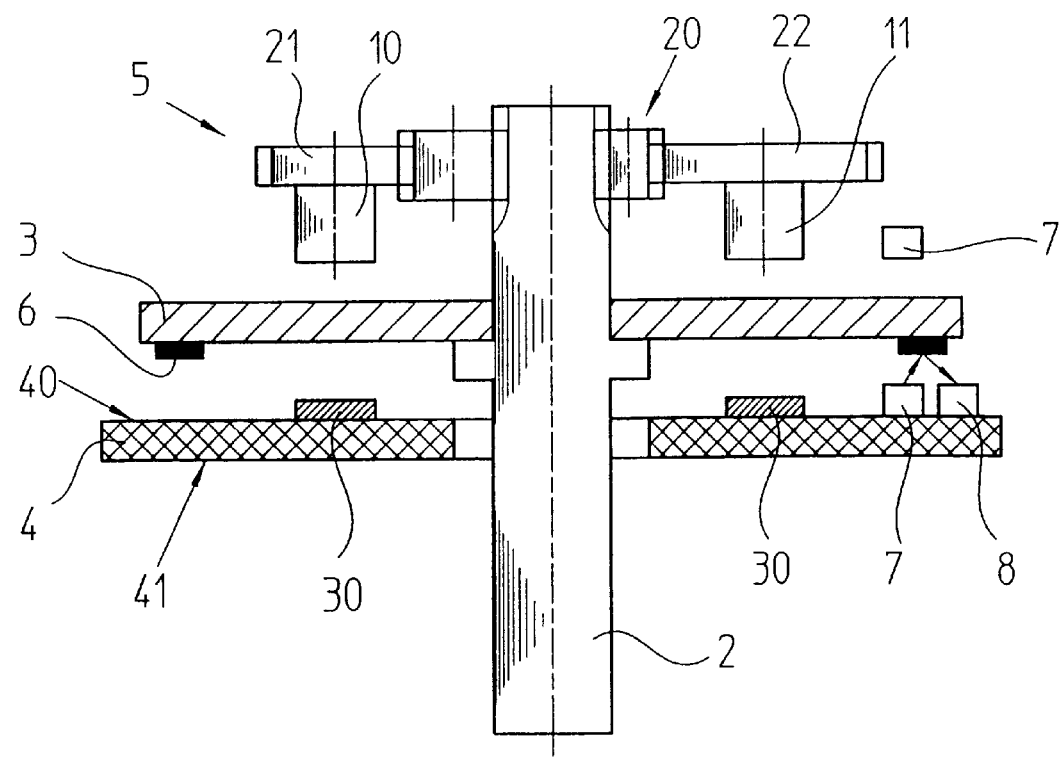
FIG. 4 is a schematic cross-sectional view of a second example embodiment of a multiturn rotary encoder.

A compact configuration is also achievable if first code disk 3 is arranged between printed circuit board 4 and magnet bodies 10, 11, 12. First code disk 3 may again be scanned by a detector device 8 in the transmitted-light or incident-light scanning method. Both alternatives are illustrated in FIG. 4. In the incident-light scanning method, light source 7 is located on printed circuit board 4 next to detector device 8, and in the transmitted-light scanning method, light source 7 is arranged on the other side of input code disk 3. All detector devices 8, 30 are applied on side 40 of printed circuit board 4 which is opposite code disk 3. The magnetic field of magnet bodies 10, 11, 12 gets through code disk 3 to magnetic-field-sensitive detector devices 30 on printed circuit board 3, which is why code disk 3 is made of non-ferromagnetic material.

Figure 5:
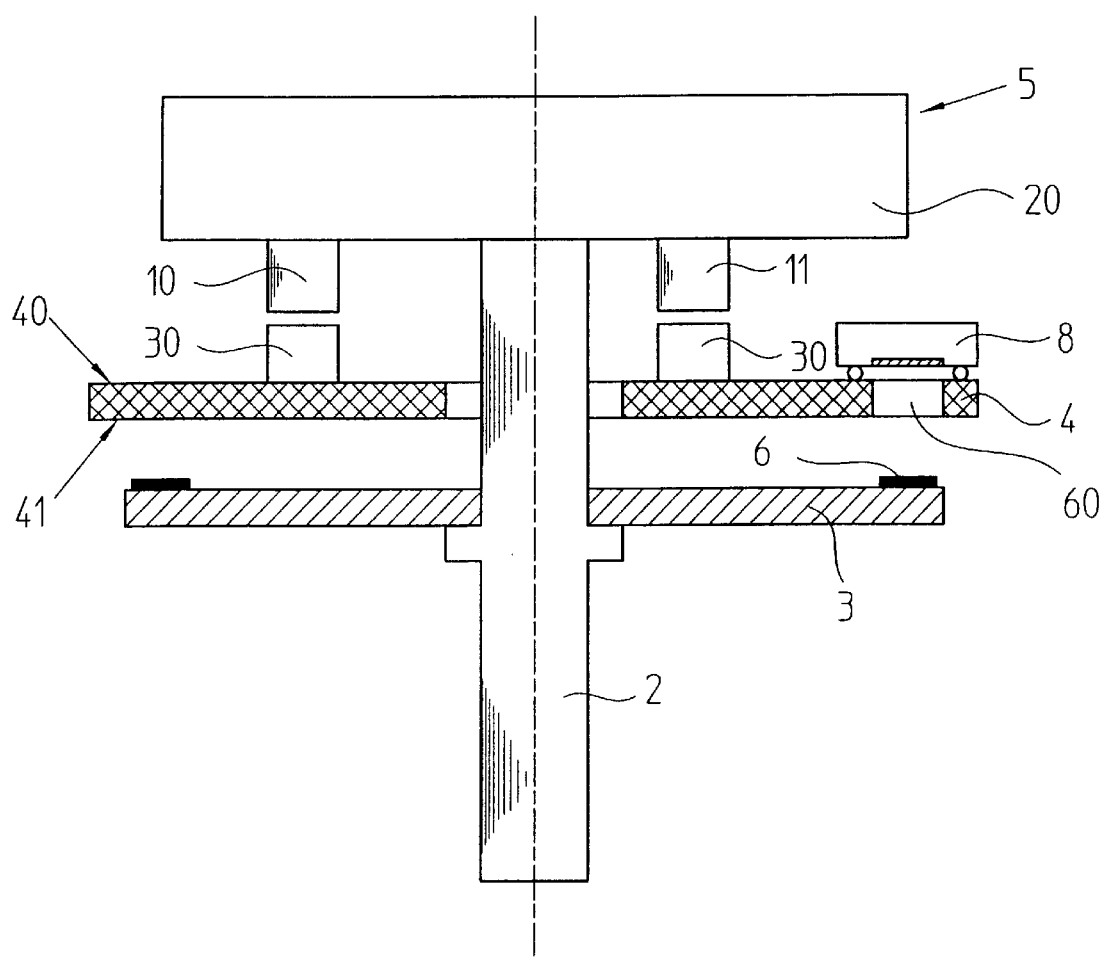
FIG. 5 is a schematic cross-sectional view of a third example embodiment of a multiturn rotary encoder.

A third exemplary embodiment is illustrated schematically in FIG. 5. Equally-acting parts are again designated here by the same reference numerals as in the previous examples. Input code disk 3, driven directly via input shaft 2, is arranged opposite surface 41 of printed circuit board 4. The other surface 40 of printed circuit board 4 bears detector device 8 for scanning code carriers 10, 11, 12 of multiturn part 5. If coding 6 is a coding able to be scanned photoelectrically, the region of printed circuit board 4 in the scanning beam path may be transparent. In the example, an opening 60 is provided for this purpose. Detector device 8 may be electrically contacted in flip-chip technology (chip-on-glass) with its light-sensitive side downward on printed conductors of printed circuit board 4. The light source is again positioned depending on whether coding 6 is scanned in the transmitted-light scanning method or the incident-light scanning method. If coding 6 is a coding able to be scanned magnetically, region 60 of printed circuit board 4 is not ferromagnetic. An opening may be provided as well.

What is claimed is:

1. A multiturn rotary encoder, comprising:
   a printed circuit board;
   a first detector device;
   a first code carrier connected to an input shaft and configured to be scanned by the first detector device to detect an angular position of the input shaft;
   at least one second detector device;
   at least one further code carrier configured to measure a number of rotations of the input shaft, each further code carrier configured to be driven geared down via a step-down gear relative to a respective preceding code carrier, each further code carrier provided with a respective one of the at least one second detector device configured to scan the further code carrier;
   wherein the at least one further code carrier is arranged within a peripheral region of the first code carrier and wherein the first detector device and the at least one second detector device are disposed on a shared side of the printed circuit board.

2. The multiturn rotary encoder according to claim 1, wherein the printed circuit board is arranged spatially between the first code carrier and the at least one further code carrier.

3. The multiturn rotary encoder according to claim 1, wherein the first code carrier is arranged spatially between the printed circuit board and the at least one further code carrier.

4. The multiturn rotary encoder according to claim 1, wherein the at least one further code carrier includes magnet bodies mounted so that the at least one further code carrier is rotatable about rotation axes that extend parallel to the input shaft, the magnet bodies magnetized differently in alternation in a direction of rotation, each magnet body assigned a respective second detector device sensitive to magnetic fields.

5. The multiturn rotary encoder according to claim 2, wherein the first code carrier is arranged opposite the shared side of the printed circuit board on which the first and the at least one second detector device are located, the at least one further code carrier arranged facing the opposite side of the printed circuit board.

6. The multiturn rotary encoder according to claim 5, wherein the printed circuit board includes one of openings and blind-end bores in a region of the at least one second detector device sensitive to magnetic fields.

7. The multiturn rotary encoder according to claim 6, wherein magnet bodies extend into the one of the openings and the blind-end bores.

8. The multiturn rotary encoder according to claim 2, wherein the at least one further code carrier is arranged opposite the shared side of the printed circuit board on which the first and the at least one second detector device are located, the first code carrier arranged facing the opposite side of the printed circuit board.

9. The multiturn rotary encoder according to claim 8, wherein the printed circuit board includes an opening in a region of the first detector device.

10. The multiturn rotary encoder according to claim 1, wherein the first code carrier includes a code disk configured to be scanned photoelectrically and assigned a photoelectric first detector device on the printed circuit board.

11. The multiturn rotary encoder according to claim 1, wherein the at least one second detector device includes a plurality of second detector devices.

12. The multiturn rotary encoder according to claim 1, wherein the at least one further code carrier includes a plurality of further code carriers.

13. The multiturn rotary encoder according to claim 2, wherein the at least one further code carrier includes magnet bodies mounted so that the at least one further code carrier is rotatable about rotation axes that extend parallel to the input shaft, the magnet bodies magnetized differently in alternation in a direction of rotation, each magnet body assigned a respective second detector device sensitive to magnetic fields.

14. The multiturn rotary encoder according to claim 3, wherein the at least one further code carrier includes magnet bodies mounted so that the at least one further code carrier is rotatable about rotation axes that extend parallel to the input shaft, the magnet bodies magnetized differently in alternation in a direction of rotation, each magnet body assigned a respective second detector device sensitive to magnetic fields.

* * * * *